United States Patent Office 2,970,193
Patented Jan. 31, 1961

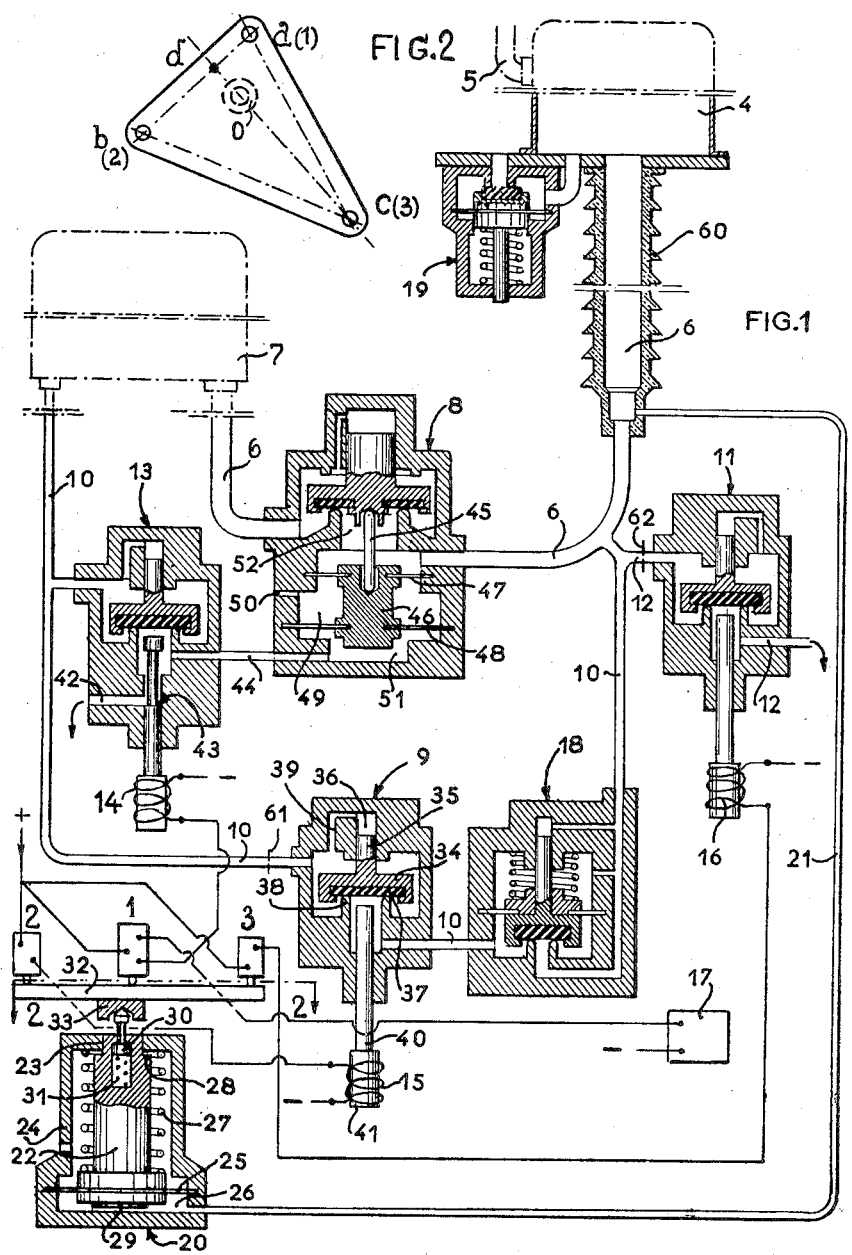

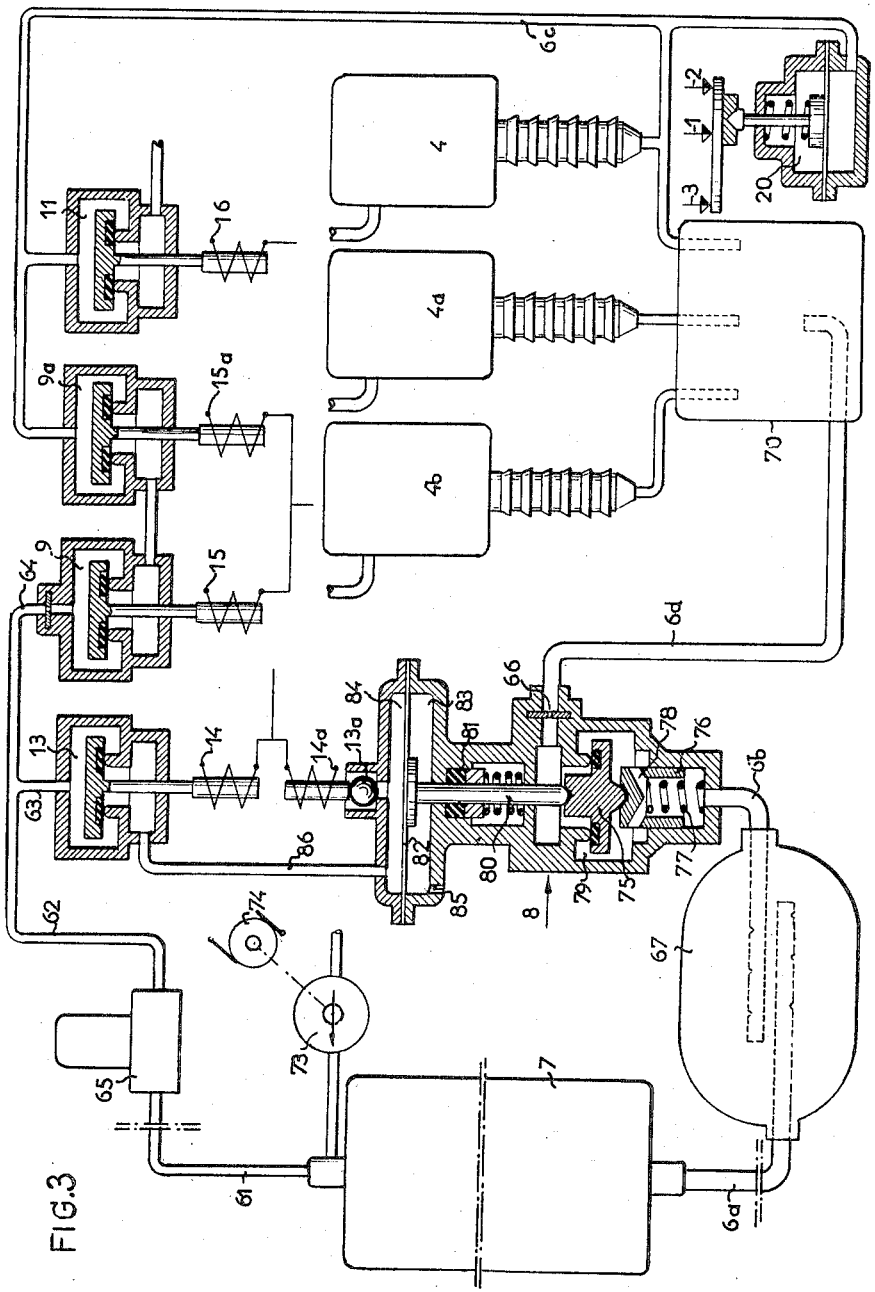

2,970,193

PRESSURE FLUID CONTROL

Jean Louis Gratzmuller, 66 Blvd. Maurice Barres, Neuilly-sur-Seine, France

Filed Dec. 15, 1958, Ser. No. 780,307

Claims priority, application France Dec. 18, 1957

10 Claims. (Cl. 200—82)

This invention relates to pressure fluid controls and more particularly to pneumatic controls of the type comprising an enclosure which will be called hereafter "the working chamber," adapted to contain a certain amount of pressure fluid such as compressed air, which is capable of ensuring an operation of the apparatus to be actuated as long as its pressure remains within a predetermined narrow range and a source capable of refilling the working chamber with the required amount of pressure fluid upon each operation of the apparatus.

For consistency of the description and due to the fact that some features of the invention are more particularly interesting with a gaseous fluid, the invention will be described hereunder as applied to pneumatic controls and, in a still more specific illustration, to compressed air controls. However, it is to be clearly understood that the scope of the invention is not to be limited to any particular type of pressure fluid and that, for example, hydraulic controls may be designed according to the teachings of the invention.

In certain applications and, in particular, in compressed air circuit-breakers, the operation of the control must be prohibited as long as the pressure of the compressed air in the working chamber has not built up to a predetermined value, at which it is capable of completely ensuring the operation of the controlled apparatus.

For example, in a compressed air circuit-breaker control, if the circuit-making operation were authorized before a sufficient pressure is available, a circuit-breaking operation happening to be triggered immediately after completion of the circuit could be made impossible, or worst, incomplete.

On the other hand, immediately after each operation of the actuated apparatus, the pressure in the working chamber suddenly drops (for example by one fourth of its initial value) and it has to resume within a short delay the value at which the following operation may be authorized, without however overreaching the maximum admissible value.

Now, once the required working pressure has been re-established, it is to be permanently maintained within two narrow limits, in spite of leakages or slow variations due to changes in the ambient temperature, in order to continuously preserve safe conditions of working.

Thus, the device provided for feeding such a control with pressure fluid has to assume two main functions, viz. rapid refilling of the working chamber and permanent compensation of slow variations of the pressure in the working chamber.

Moreover, the compensation should not give rise to any hunting effect and should never cause actuation of the means provided for ensuring rapid refilling. Furthermore, once the working pressure is built up, the slow variations should not cause a drop of the pressure beneath the working range, even for a short delay.

Now, the air contained in the working chamber of a pneumatic control according to the invention should be as dry as possible, in particular for controlling electric apparatus. Finally, it is advantageous to use one single source, both for actuating such apparatus and for controlling the pressure in the working chamber.

The main object of the invention is to provide a pressure fluid control of the type described which comprises a compensating system, including a low-rate inlet valve and an outlet port, and adapted to maintain the pressure in the working chamber within the working range as long as said pressure undergoes but slow variations and a rapid refilling valve adapted to quickly reset the pressure in the working chamber to a value comprised within said working range upon a sudden drop of the pressure in said chamber beneath said working range, e.g. after actuation of the controlled apparatus.

Another object of the invention is to complete the above described control by a third low-rate valve associated with the compensating outlet port, said valve remaining closed as long as the pressure in the working chamber remains within the above defined working range, but being automatically opened as soon as said pressure reaches the upper limit of said range.

Still another object of the invention is to control the three above defined valves by means of one single device responsive to the pressure in the working chamber. For this purpose, the compensating inlet valve is so designed that its rate of flow is sufficient to compensate a slow variation of pressure in the working chamber before said pressure has time to drop under the critical value at which the rapid refilling valve would automatically open.

In order to ensure rapid refilling while preventing the pressure in the working chamber from overreaching the upper limit of the working range, it is another object of the invention to design the rapid refilling valve in such a manner that it be capable of closing within a very short delay.

For this purpose, another object of the invention is to control the rapid refilling valve by means of a pilot valve which acts as a relay to accelerate the opening and closing of the rapid refilling valve without unduly increasing the power required for this purpose.

In the case when both the compensating system and the rapid refilling system are controlled by one single device responsive to the pressure in the working chamber, the said device is so designed and adjusted that the operating "brackets" of the three valves partly overlap so as to reduce the overall range of critical pressures involved in the control.

A more specific object of the invention is to control both the compensating system and refilling system by means of electro-magnetically actuated valve means controlled by microswitches suitably operated, e.g. by the above-mentioned single pressure responsive device. A first one of said electro-valves may constitute the above-mentioned pilot valve and a second one constitutes the low-rate inlet valve of the compensating system while finally, if the latter also includes an outlet valve, the same may be constituted by a third electro-valve.

A still more specific object of the invention is to control the above-mentioned microswitches by means of a pressure responsive device adapted to operate said microswitches in such a manner as to cause opening of the quick refilling valve and opening of the outlet valve, respectively, for two critical pressures whose difference is but slightly greater than the operating "bracket" of said pressure responsive device.

Still a further object of the invention is to feed the working chamber with the required pressure fluid from a high pressure source through the above-mentioned rapid refilling valve.

This arrangement offers a number of advantages:
First of all, in the case of a pneumatic control and in particular a compressed air control, the drop of pressure between the source and the working chamber determines an increase of the volume occupied by a same mass of air. Now, the nominal humidity of air may be defined as the mass of water suspended in each unit of the volume occupied by the air. Therefore, any increase of said volume results in a corresponding reduction of the air nominal humidity, and this reduction is an increasing function of the pressure difference between the source and the working chamber. Such a reduction of the air nominal humidity minimizes the risks of internal icing, which is extremely important in the case of open air installations, while avoiding to a considerable extent, in the case when the working chamber is intended to control electric apparatus, unwanted electric current flow along the walls of all live parts.

It is thus obvious that the use of a high pressure source of fluid is extremely advantageous in the control of pneumatic circuit-breakers.

Furthermore, the use of a source of high pressure permits reducing, all other things being equal, the cross-section of the main feed duct as well as the size of the rapid refilling valve, which results in a noticeable lowering of the installation cost.

Now, since it is extremely difficult to actuate high pressure fluid valves by means of electro-magnets, it is another object of the invention to feed the pilot valve as well as the low-rate inlet valve from a source of lower pressure. As for the outlet valve, if any, since it is fed from the working chamber, it obviously undergoes only the comparatively low pressure prevailing in said chamber.

Another object of the invention is to feed the pilot valve and the low-rate inlet valve from the high pressure source provided for feeding the controlled apparatus through a pressure-reducer.

Still a further object of the invention is to limit the rate of flow of the fluid through the rapid refilling valve either by means of a flow-restrictor or by using ducts of reduced cross-sections. The flow-restrictor is preferably disposed upstream the valve if the latter badly supports high pressure or downstream the valve if the same is adapted to high pressure.

If the limitation of the rate of flow is merely due to reduced cross-section of the ducts, the snap-like closing of the rapid refilling valve may give rise to the so-called "ram-effect" which results in surges of pressure and, in the case when the fluid is a gas, such surges may cause prohibitive heating of the movable valve member.

To overcome this drawback, another object of the invention is to provide a buffer-container premanently communicating with the main feed duct immediately upstream the valve.

In certain cases, it may be advantageous to provide both a flow-restrictor and such a buffer-container.

Other objects and advantages of the invention will be apparent from the following detailed description, together with the accompanying drawings submitted for purpose of illustration only and not intended to limit the scope of the invention, reference being had for that purpose to the sub-joined claims.

In these drawings:

Fig. 1 is a lay-out diagram of a pneumatic control according to the invention, intended to be used for controlling a pneumatic circuit-breaker.

Fig. 2 is a sectional detail view along line 2—2 of Fig. 1, and

Fig. 3 is a lay-out diagram of a modification of the invention, in which the pneumatic control is provided with a source of high pressure fluid, a pressure-reducing device, a flow-reducing member and a buffer container.

For the sake of clarity, the various parts of the control have been shown in the drawings with exaggerated relative sizes.

In the example shown in Figs. 1 and 2, a working chamber 4 supplies compressed air, through a duct 5, into a pneumatic circuit-breaker (not shown).

In this construction, the working chamber 4 is live and provided with an insulator 60. The main feed duct, through which the required stock of compressed air is permanently supplied into the working chamber 4, has been shown at 6. The said compressed air is generated by a suitable source such as diagrammatically shown at 7, which may be constituted, for example, by a reservoir, a pressure-reducer or a container.

The filling or refilling of the working chamber 4 with compressed air through duct 6 are primarily controlled by a rapid refilling valve, generally shown at 8. The compensating of leakages or slow pressure variations, e.g. resulting from changes in the ambient temperature, is ensured, in the example shown, on the one hand, by a low-rate inlet valve, generally shown at 9, incorporated in a secondary feed duct 10 and, on the other hand, by a low-rate outlet valve, generally shown at 11, incorporated in a low-rate outlet duct 12. The rapid refilling valve 8 is actuated by an electro-valve 13, while the compensating valves 9 and 11 are constituted by electro-valves. These three electro-valves 13, 9 and 11 are respectively operated by electro-magnets 14, 15 and 16, whose energizing circuits are controlled, in turn, by microswitches 1, 2, 3. The microswitch 3 causes energizing of the electro-magnet 16 by closing a make-contact, while the electro-magnets 14 and 15 are normally excited through break-contacts of the microswitches 1 and 2, respectively. Moreover, a further make-contact of the microswitch 1 controls the feeding of an inhibition device, diagrammatically shown at 17, of suitable type, whose function is to prevent the controlled apparatus (in the example described, the pneumatic circuit-breaker) from being actuated as long as the pressure in the working chamber 4 is not sufficiently high.

A non-return valve, generally shown at 18, is interposed, in the secondary duct 10, between the electro-valve 9 and the working chamber 4. The said non-return valve has for its purpose to suppress leakages from the working chamber along the rod 40 provided for actuating the electro-valve 9. The working chamber 4 is further equipped with a safety valve, generally shown at 19, the function of which is to permit the escape of compressed air in the case of a strong unexpected surge of pressure in the chamber 4. A device responsive to the pressure in the chamber 4, generally shown at 20, actuates the microswitches 1, 2, 3, in a manner described in detail hereunder, in response to pressure variations in said chamber. For this purpose, this device is fed through a pressure intake pipe 21 from a point located in the main feed duct 6, as near as possible the chamber 4.

In the example shown, the pressure responsive device 20 essentially comprises a rod 22, slidably mounted at 23 in the casing 24. The rod 22 is secured on a diaphragm 25; said diaphragm constitutes, inside the casing 24, a movable partition for a pressure chamber 26 communicating with the pressure intake pipe 21. A spring 27 continuously urges the rod 22 against the action of the pressure at 26. The stroke of the rod 22 is limited to a small value by means of abutments 28 and 29. The rod 22 carries a push-needle 30 through a stress-limiting spring 23. The push-needle 30 bears against a plate 32 in a centering boss 33. Finally, when the pressure at 26 reaches a certain value, the plate 32, under the action of the push-needle 30, is pressed under the three respective movable contacts of the microswitches 1, 2, 3.

In the example shown, both electro-valves 9 and 11 are of the same type, so that only one of them will be described hereunder. The electro-valve 9 comprises a movable member 34, carried by a rod 35, slidably mounted in a bore 36 of the casing of said valve and whose fluid-tight part 37 normally bears on a seat 38. An inlet port connected, in the example shown, with the upstream section of the duct 10, communicates with an outlet port connected, in the example shown, to the downstream section of the said duct, under the control of the movable member 34 and through the seat 38. The bore 36 communicates with the inlet port through a passage 39. Finally, the movable member 34 may be unseated by means of a control rod 40, rigid with the moving core 41 of the electro-magnet 15. In the example shown, the rod 40 acts as a hammer. In other words, its active end is, at rest, slightly spaced from the movable member 34, upon which it impinges when the electro-magnet 40 is excited. In the drawings, the energizing of the electro-magnet 15 causes lifting of the moving core 41 and, hence, of the rod 40. Owing to the presence of the passage 39, the movable member 34 is seated under the action of the pressure in the upstream section of the duct 10.

The electro-valve 13 is generally similar to the electro-valves 9 and 11, except that it is of the "feed-and-exhaust" type; further to its inlet and outlet ports mentioned above, the electro-valve 13 comprises an exhaust port 42, controlled by a shouldering 43 of its actuating rod which, when the electro-magnet 14 is not excited, sets a duct 44 connected with the normal outlet port of the electro-valve, into communication with the said exhaust port, 42. When the electro-magnet 14 is excited, the shouldering 43 obturates the exhaust port 44 before the active end of the control rod unseats the movable member of the electro-valve to cause feeding of the duct 44 from the duct 10.

The rapid refilling valve 8 is similar to the electro-valves 9 and 11. However, its movable member, instead of being controlled by an electro-magnet, is actuated, through a rod 45, from a moving core 46 carried by two diaphragms 47 and 48. The rod 45 is only capable of transmitting pushing forces and it bears, by its both ends, in centering bosses, respectively integral with the moving core 46 and the valve movable member; this arrangement permits accommodating slight misalignment between the said movable member and the moving core 46, and to omit any guiding means for the latter, since the diaphragms 47 and 48 are capable of approximately keeping it on the valve axis. There is thus formed between the diaphragms 47 and 48 a compartment 49 which communicates with outside at 50, so that its volume freely varies as the moving core 46 is displaced. On that side of the diaphragm 48 which is opposed to the compartment 49 is formed a pressure chamber 51 which communicates with the duct 44 of the electro-valve 13. The active area of the diaphragm 48 is greater than that of the diaphragm 47.

The rapid refilling valve 8 is controlled by the pilot electro-valve 13 as follows:

When the electro-magnet 14 is not excited, the movable member of the electro-valve 13 is closed and the duct 44 communicates with outside. Under these conditions, the movable member of the refilling valve 8 is held on its seat. As the electro-magnet 14 is excited, the rod of the electro-valve 13 interrupts at 42 the communication between the duct 44 and outside and connects the said duct 44 to the source 7 through the duct 10. Under these conditions, the source pressure is made capable of acting at 51 against the action of the pressure in chamber 4 which also prevails at 52. Since the pressure in the source is always at least equal to that of chamber 4 and since the diaphragm 48 has an effective area greater than the diaphragm 47, the moving core 46 is urged upwardly and unseats the movable member of the rapid refilling valve 8, which sets the chamber 4 into communication with the source 7 through the duct 6.

The above-described pneumatic control device operates as follows:

The pressure responsive device 20 is so designed that when the pressure in the chamber 4 increases from zero value, the microswitches 1, 2, 3 are successively actuated in this order, while if the said pressure decreases, the said device releases the said microswitches in the reverse order, viz. 3, 2, 1. When none of the three microswitches is actuated, the break contacts of the microswitches 1 and 2 respectively ensure energizing of the electro-magnets 14 and 15 so that both the compensating electro-valve 9 and the rapid refilling valve 8 are kept open. The valve 8 is maintained in its open state through the electro-valve 13 as described above. Moreover, since the make-contact of the microswitch 1 is open, the inhibiting device 17 is not excited, so that any actuation of the controlled apparatus is prohibited. Finally, since the make-contact of the microswitch 3 is also open, the electro-magnet 16 is not excited and the compensating exhaust electro-valve 11 is closed. Under these conditions, the source 7 feeds the working chamber 4 with compressed air at a maximum rate of flow, since both inlet valves are open while the sole exhaust valve is closed. As the microswitch 1 is operated, it opens its break-contact, which causes de-energizing of the electro-magnet 14 and, hence, closing of the rapid refilling valve 8. In the same time, the microswitch 1 closes its make-contact, so that electric current is supplied into the inhibiting device 17. Under these conditions, the refilling of the working chamber 4 goes on at a rate of flow which continuously decreases as the rapid refilling valve 8 closes, down to a minimum value corresponding to the rate of flow of the compensating inlet electro-valve 9; during this period, the exhaust electro-valve 11 remains closed.

As the microswitch 2 is actuated, it opens its break-contact and the electro-magnet 15 releases, which triggers closing of the low-rate inlet electro-valve 9. Under these conditions, the rate of refilling of the working chamber 4 further decreases until it becomes nil; during this period also, the exhaust electro-valve 11 remains closed.

Finally, as the microswitch 3 is actuated, it closes its make-contact, which causes energizing of the electro-magnet 16 that triggers the opening of the compensating exhaust electro-valve 11.

The successive release of the microswitches 3, 2, 1 gives rise to the same process, but in the reverse order; in other words, this release successively causes closing of the exhaust electro-valve 11, opening of the low-rate inlet valve 9 and, finally, opening of the rapid refilling valve 8, this last step taking place simultaneously with the de-energizing of the inhibiting device 17, which thereupon prohibits any actuation of the controlled apparatus.

In a preferred embodiment, in order to minimize the range between the minimum and the maximum values of the pressure in the working chamber 4, the working "brackets" of the microswitches preferably overlap to the greatest possible extent, in the manner described hereunder. There is used for this purpose a pressure responsive device such as shown in the drawings, in which the overall stroke of the push-needle 30, which is required for successively actuating the three micro-switches 1, 2, 3, is reduced to a value equal to that of the stroke of any one of the movable contacts of said microswitches; moreover, by judiciously choosing the respective locations of the said movable contacts on the plate 1 with respect to the point of said plate which the push-needle 30 acts upon, it is possible to make the working "brackets" of the three microswitches widely overlap one another, while disposing of a sufficient safety margin.

In Fig. 2 is illustrated a relative arrangement of the movable contacts $a$, $b$, $c$ of the microswitches 1, 2, 3 respectively, as well as the point $o$ of the plate 1 which is acted upon by the push-needle 30. This arrangement, which is capable of ensuring such an overlapping, is obtained by drawing a straight line passing through two points $a$ and $b$, e.g. corresponding to the minimum spacing between the two microswitches 1 and 2; then, from a point $d$, of the line $ab$ there is drawn a perpendicular to $ab$, such that $bd/ad$ be equal to a predetermined value, $d$ being nearer $a$ than $b$ is; now two points $o$ and $c$ are platted on the said perpendicular, so that $od$ and $oc$ be in a predetermined ratio, $o$ being nearer $d$ than $c$ is.

Let P be the pressure at which the microswitch 1 releases and $P+\delta$ the pressure at which the microswitch 3 is actuated; then the pressure in the working chamber is to be continuously maintained between P and $P+\delta$. This range is equal to the pressure interval of operation of the pressure responsive device 20 added with the difference between the pressures at which the microswitches 1 and 3 are respectively released or actuated. Since this last difference is far smaller than the said pressure interval, the effective respective brackets of the microswitches 1, 2 and 3 will partly overlap and hence the range $\delta$ will be but slightly greater than the pressure interval of operation of the pressure responsive device.

The pneumatic control device according to the invention then operates as follows:

Upon operation of the controlled apparatus, the pressure in the working chamber 4 is far lower than P. Both inlet valves 8 and 9 are open while the exhaust valve 11 is closed. The pressure at 4 rapidly builds up. As the pressure reaches P, the microswitch 1 is actuated and the operation of the controlled apparatus becomes authorized while the rapid refilling valve begins to close. During this closing step, the pressure further builds up, but slower and slower; the microswitch 2 is actuated in turn, the compensating inlet valve 9 closes, the pressure increase further slows down; finally, if the pressure $P+\delta$ happens to be reached, the microswitch 3 is actuated, the exhaust valve 11 opens and the pressure at 4, which first further increases but still more slowly, reaches a maximum value and then slowly decreases, until it causes re-closing of the exhaust valve 11. From this moment, the pressure at 4 theoretically remains constant if there is no leakage and if the ambient temperature does not change. In response to leakages or variations in the ambient temperature, the pressure at 4 slowly decreases or increases. If it drops to the release value of the microswitch 2, the compensating inlet valve 9 opens while, conversely, if the pressure in the chamber 4 reaches $P+\delta$, the exhaust valve 11 opens. The rates of flow of these two compensating valves are so chosen as to be sufficient for compensating such slow variations. Under such conditions, the pressure at 4 is always maintained between the two above-defined values. It is only upon operation of the controlled apparatus that the pressure at 4 suddenly decreases at a rate which is so high that the compensating valve 9 is no more capable of stopping its dropping. Then, the pressure becomes lower than P, anew, the rapid refilling valve 8 opens again and the operation of the controlled apparatus is prohibited once more.

It may happen that the pressure at 4 builds up so quickly that the compensating exhaust valve 11 becomes incapable of preventing it from increasing, for example if one of the inlet valves is deteriorated. To overcome this drawback, a safety valve is preferably provided as shown at 19 and said valve opens if the pressure at 4 incidentally reaches a dangerous value, for example superior to P by 10%.

In order to avoid any hunting effect, the compensating valves 9 and 11 are preferably associated with flow-restrictors 61 and 62 adapted to regulate the rates of flow of said valves.

In the embodiment shown in Fig. 3, there is shown at 8, as previously, the rapid refilling valve which controls the feeding of three working chambers 4, 4a, 4b from a high pressure compressed gas source which is constituted, in the example shown, by a reservoir 7, in which compressed gas is stocked by means of a compressor 73, driven by an electric motor 74; a pilot electro-valve 13 controls the rapid refilling valve 8 the electro-magnet of which is shown at 14. As previously set forth electro-valves 9 and 11 constitute the low-rate inlet valve and the low-rate exhaust valve respectively. An additional electro-valve 9a, actuated by an electro-magnet 15a, which is connected in parallel with the electro-magnet 15 of the electro-valve 9, is interposed between the low-rate feed duct 6c and the outlet of the low-rate inlet valve 9. This additional electro-valve 9a has the same function as the non-return valve 18 which has been described with reference to Fig. 1.

In the embodiment of Fig. 3, the electro-valves 13 and 9 are fed from the reservoir 7 respectively through the ducts 61, 62, 63 and through the ducts 61, 62, 64. A pressure-reducer 65 is interposed between the ducts 61 and 62. Thus, this pressure-reducer, which is fed from the reservoir 7 with a comparatively high pressure fluid, is capable of supplying a comparatively low pressure fluid which may be easily overcome by the action of the electro-magnets 14 and 15 respectively of the movable members of the associated valves.

The rapid refilling valve 8 is so designed as to be capable of controlling high pressure flow; however, to reduce the velocity at which the compressed air flows therethrough, there has been incorporated in the main feed duct 6, downstream the valve 8, a flow-restrictor 66 which has been diagrammatically shown in the shape of a nozzle.

The valve 8 comprises a movable member 75 mounted through a swivel joint on a guiding piston 76, continuously urged by a spring 77 in the direction corresponding to seating of the movable member 75. The piston 76 is widely bored axially and its bore communicates through ports 78 with the valve chamber 79, which communicates in turn, through the valve seat and under the control of the flow-restrictor 66, with the section 6d of the main feed duct.

A rod 80, slidably mounted in the valve casing through a packing gland 81, is carried by a diaphragm 82 freely movable in a chamber which is thus divided into two compartments 83, 84. The compartment 83 freely communicates with outside at 85 and the compartment 84 may be fed with compressed air through a duct 86 from the pilot valve 13. Finally, the compartment 84 may be placed into communication with the exterior under the control of the electro-valve 13a actuated by an electro-magnet 14a, connected in parallel with the electro-magnet 14 of the electro-valve 13.

The duct 6 permanently communicates, immediately upstream the rapid refilling valve 8, with a buffer container 67. The section 6b of the duct 6 which interconnects the buffer container 67 with the valve 8, preferably has a greater cross-section than the rest of the duct 6, so as to reduce the speed at which compressed air enters the valve 8.

The parallel feeding of the three working chambers 4, 4a, 4b takes place through a tranquillizing chamber 70 which permits ensuring a more uniform distribution of the controlled pressure. The pressure intake pipe feeding the pressure responsive device 20 is branched to the feeding duct as near as possible anyone of the working chambers (4 in the example shown).

The operation of this device is similar to that described above with reference to Figs. 1 and 2, so that it will be but broadly described again, with detail modifications more particularly pertaining to Fig. 3; in particular, those electric connections which have been described above are not shown in Fig. 3.

Under the control of the device 20, which is responsive to the pressure in the working chamber 4 and by means of suitable switching means (which may be, for instance, constituted by the above-described microswitches 1, 2, 3) when said pressure reaches a certain value, e.g. due to thermal expansion, the low-rate exhaust valve 11 opens while, conversely, if the pressure slowly drops down to a certain value, the low-rate inlet valve 9 intervenes while the additional valve 9a opens.

It will be easily understood that, when that additional valve 9a is closed, its movable member constitutes a tight obstacle opposing any return of compressed air towards the low-rate inlet valve 9. This feature is important since the control rod of the last-mentioned valve 9, which is to be actuated by an electro-magnet, cannot possibly be provided with a packing gland which would oppose too much friction to the action of said electro-magnet.

Now, if the pressure in the chamber 4 suddenly drops, for example upon operation of the controlled apparatus, the pilot valve 13 opens, while the additional exhaust valve 13a is kept seated under pressure by the electro-magnet 14a. The control pressure is then free to act in the chamber 84 and displaces the diaphragm 82 downwardly (in the drawing); so that the pushing rod 80 unseats the movable member 75 which triggers the rapid refilling of the working chambers 4, 4a, 4b under the control of the buffer container 67 and the flow-restrictor 66.

The pressure then rapidly builds up in the said working chambers and, when it has reached the predetermined value at which the rapid refilling valve 8 should close, the pilot valve 13 is closed again, while the electro-magnet 14a releases the additional exhaust valve 13a. The spring 77 is then capable of quickly closing the valve movable member 75 again, since the chamber 84 now freely communicates with outside.

After the rapid refilling valve 8 has been closed, the pressure further builds up slowly in the working chambers which are now fed exclusively through the low-rate inlet valve 9. The latter closes in turn as soon as the required pressure is re-established in the working chambers.

While the invention has been described with particular reference to preferred embodiments, it is not intended to limit the scope of the invention to the embodiments illustrated, nor otherwise than the terms of the subjoined claims.

What I claim is:

1. A pressure fluid control comprising, in combination, a working chamber adapted to contain a given amount of pressure fluid which is capable of ensuring an operation of the apparatus to be controlled as long as its pressure remains within a predetermined narrow working range having a lower limit, a source of pressure fluid capable of continuously covering the needs of said working chamber in pressure fluid, a high-rate inlet valve means interposed between said source and said working chamber, a compensating system including a low-rate inlet valve means interposed between said source and means defining said working chamber and an outlet communicating with said working chamber, said compensating system being adapted to keep the pressure in said chamber lower than the upper limit of said working range and valve controlling means operable in response to the pressure in said working chamber to trigger the opening of said low-rate inlet valve means whenever said pressure drops down to a predetermined value above the lower limit of said working range and to also trigger the opening of said high-rate inlet valve means whenever said pressure drops down to the lower limit of said working range.

2. A pressure fluid control according to claim 1, wherein said low-rate inlet valve means is constructed and arranged to keep the pressure in said chamber higher than said predetermined value above the lower limit of said working range as long as the pressure in said working chamber undergoes but slow variations.

3. A pressure fluid control according to claim 1, wherein said source of pressure fluid has its output pressure considerably above the upper limit of said working range, said high-rate inlet valve means being adapted to close in a snap-like fashion, and a buffer-container interposed between said source and said high-rate inlet valve means and adjacent said high-rate inlet valve means.

4. A pressure fluid control comprising, in combination, a working chamber adapted to contain a given amount of pressure fluid which is capable of ensuring an operation of the apparatus to be controlled as long as its pressure remains within a predetermined narrow working range, said chamber having an outlet for leading fluid to the apparatus to be controlled, a source of pressure fluid capable of continuously covering the needs of said working chamber in pressure fluid, a conduit system providing communication between said source and chamber, a high-rate inlet valve means interposed in said conduit system between said source and said working chamber, pilot valve means comprising a first electro-magnetically actuated valve operatively connected with said high-rate inlet valve, a low-rate pressure fluid feeding inlet valve means comprising a second electro-magnetically actuated valve in said conduit system between said source and said working chamber, a low-rate outlet valve means comprising a third electro-magnetically actuated valve communicating with said working chamber, an energizing circuit for said electro-magnetically actuated valves each one of said electro-magnetically actuated valves being adapted to be opened in response to energizing of its associated electro-magnet, first, second and third microswitches respectively incorporated in the energizing circuits of said first, second and third electro-magnetically actuated valves and a unit responsive to the pressure in said working chamber and operatively connected with said microswitches to maintain the electro-magnets of said three valves de-energized as long as the pressure in said working chamber remains within said working range, to cause energizing of the electro-magnetically actuated magnet of said third electro-valve whenever said pressure reaches the upper limit of said working range, to cause energizing of said second electro-magnetically actuated valve whenever said pressure drops down to a predetermined value comprised within said range and to cause energizing of the electro-magnet of said first electro-magnetically actuated valve also whenever said pressure drops down to the lower limit of said working range.

5. A pressure-fluid control comprising, in combination, a working chamber adapted to contain a given amount of pressure fluid which is capable of ensuring an operation of the apparatus to be controlled as long as its pressure remains within a predetermined narrow working range, a source of pressure fluid having an output pressure considerably above said working range and capable of continuously covering the needs of said working chamber in pressure fluid, a high-rate inlet valve means interposed between said source and said working chamber, a compensating system including a low-rate pressure fluid feeding inlet valve means and a low-rate outlet valve means, both communicating with said working chamber, and valve control means including means operably associated with the respective valve means and responsive to the pressure in said working chamber to trigger the opening of said low-rate outlet valve means whenever said pressure builds up to the upper limit of said working range, to trigger opening of said low-rate inlet valve means whenever said pressure drops down to a predetermined value above the lower limit of said working range and to also trigger the opening of said high-rate inlet valve means whenever said pressure drops down to the lower limit of said working range.

6. A pressure fluid control according to claim 5, wherein said valve controlling means includes a switching system constructed and arranged to actuate and release said three valve means respectively for three partly overlapping ranges of the pressure in said working chamber.

7. A pressure fluid control according to claim 5, and a flow-restrictor operably associated with each one of said low-rate valve means.

8. A pressure fluid control according to claim 5, further comprising flow-restricting means associated with said high-rate inlet valve means.

9. A pressure fluid control according to claim 5, wherein said high-rate inlet valve means is adapted to control high-pressure fluid flow, and flow restricting means interposed between said high-rate inlet valve means and said working chamber.

10. A pressure fluid control comprising, in combination, a working chamber adapted to contain a given amount of pressure fluid which is capable of ensuring an operation of the apparatus to be controlled as long as its pressure remains within a predetermined narrow working range, a source of pressure fluid having an output pressure considerably above said working range and capable of continuously covering the needs of said working chamber in pressure fluid, a high-rate inlet valve means interposed between said source and said working chamber, a pressure-reducer supplied with fluid from said source, a low-rate inlet valve means interposed between said pressure-reducer and said working chamber, a low-rate outlet valve means communicating with said working chamber and valve control means operable in response to the pressure in said working chamber to trigger opening of said low-rate outlet valve means whenever said pressure builds up to the upper limit of said working range, to trigger opening of said low-rate inlet valve means whenever said pressure drops down to a predetermined value above the lower limit of said working range to trigger the opening of said high-rate inlet valve means also, whenever said pressure drops down to the lower limit of said working range.

References Cited in the file of this patent

UNITED STATES PATENTS

| | | |
|---|---|---|
| 1,912,024 | Uebermuth | May 30, 1933 |
| 2,680,793 | Schneider et al. | June 8, 1954 |
| 2,730,589 | Perry et al. | Jan. 10, 1956 |

FOREIGN PATENTS

| | | |
|---|---|---|
| 337,508 | Great Britain | Nov. 6, 1930 |
| 394,620 | Great Britain | June 29, 1933 |